(12) United States Patent
Manabe et al.

(10) Patent No.: US 8,727,538 B2
(45) Date of Patent: May 20, 2014

(54) IMAGE PROCESSING APPARATUS AND IMAGE PROCESSING METHOD

(75) Inventors: Yoshihiro Manabe, Yokohama (JP); Kiwamu Kobayashi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 782 days.

(21) Appl. No.: 12/948,473

(22) Filed: Nov. 17, 2010

(65) Prior Publication Data
US 2011/0128294 A1     Jun. 2, 2011

(30) Foreign Application Priority Data

Nov. 27, 2009  (WO) .................. PCT/JP2009/069998

(51) Int. Cl.
*G03B 21/14*     (2006.01)
(52) U.S. Cl.
USPC ............... 353/69; 353/30; 353/31; 353/70; 353/85; 353/94; 348/189; 348/744; 345/629; 345/597
(58) Field of Classification Search
USPC .............. 353/30, 31, 69, 70, 71, 85, 94, 121; 348/189, 383, 744–745, 750, E9.025, 348/E9.027; 349/5, 7–9, 62; 345/582, 629, 345/597
See application file for complete search history.

(56) References Cited

U.S. PATENT DOCUMENTS

| | | | | |
|---|---|---|---|---|
| 5,930,405 | A   * | 7/1999 | Chida | 382/284 |
| 6,545,685 | B1 * | 4/2003 | Dorbie | 345/582 |
| 8,045,006 | B2 * | 10/2011 | Miceli | 348/189 |
| 8,379,066 | B2 * | 2/2013 | Goerzen | 345/698 |

FOREIGN PATENT DOCUMENTS

| | | |
|---|---|---|
| JP | 11-98439 A | 4/1999 |
| JP | 2005-117266 A | 4/2005 |
| JP | 2005-354566 A | 12/2005 |
| JP | 2006-14146 A | 1/2006 |
| WO | 2005-034512 A1 | 4/2005 |

* cited by examiner

*Primary Examiner* — Sultan Chowdhury
(74) *Attorney, Agent, or Firm* — Canon USA, Inc., IP Division

(57) ABSTRACT

An image processing apparatus includes an acquiring unit, a specifying unit, a smoothing unit, and an output unit. The acquiring unit acquires resolutions of first and second projectors and region information regarding projected regions. The specifying unit specifies a boundary between the projected regions, the second projector having higher resolution than the first projector, based on the acquired region information. The smoothing unit executes smoothing on a predetermined region within a projected region based on the acquired resolutions of the first and second projectors such that a pixel, obtained based on a first pixel by executing the smoothing, has been affected according to a second pixel then a third pixel, wherein the first pixel is in the predetermined region, the first and second pixels are arrayed parallel to the specified boundary, and the first and third pixels are arrayed perpendicular to the boundary. The output unit outputs smoothed image data.

22 Claims, 10 Drawing Sheets

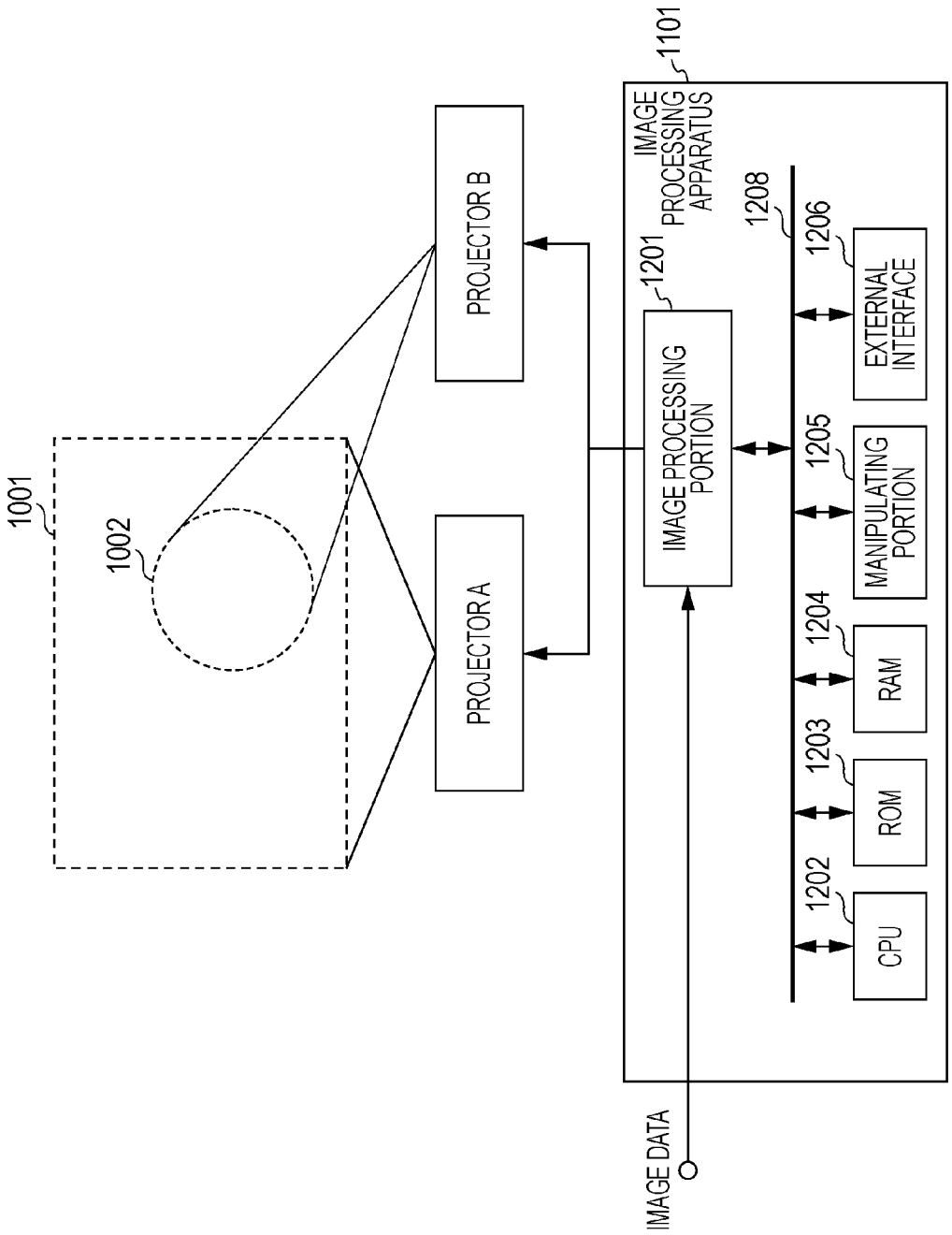

IMAGE PROCESSING APPARATUS AND IMAGE PROCESSING METHOD

TECHNICAL FIELD

The present invention relates to an image processing method when an image is projected by using a plurality of projectors.

BACKGROUND ART

Recently, multi-projection has been widely used in which an image based on one set of image data is displayed by using a plurality of projectors. In the following, a manner of displaying one image by arraying projected regions of the plurality of projectors in a tiled pattern is particularly called "tiled display".

As a method of coupling adjacent projected regions of the projectors to each other in the tiled display, the following examples are known. As one example, there is known a method of coupling two projected regions A and B while making adjustment such that those projected regions are not overlapped with each other. As another example, there is known a method of preparing an overlapped region at the boundary between the projected regions A and B, projecting a common image P to each of respective overlapped regions, and coupling those overlapped regions while making adjustment such that the common images P are exactly superposed with each other. Patent Literature 1 discloses a method of automatically determining a start point and an end point of an overlapped region (edge blend) at each boundary between respective projected regions of the plurality of projectors.

CITATION LIST

Patent Literature

PTL 1 Japanese Patent Laid-Open No. 11-98439

However, an image based on image data is displayed by using a plurality of projectors, there is a risk that the boundary between respective projected regions of the projectors is conspicuous.

For example, when the tiled display is performed by using a plurality of projectors having different resolutions, there is a risk that the boundary between the projector having a lower resolution and the projector having a higher resolution is more conspicuous than the case where the tiled display is performed by using projectors having the same resolution.

As another example, when, of first and second projectors having the same resolution, a field angle of the first projector is set to be smaller than that of the second projector and the first projector projects an image within a projected region of the second projector, there is a risk that the boundary between the respective projected regions is conspicuous. This is because, when the projectors having the same resolution are used, the projector having a smaller field angle provides a higher resolution and hence a difference in resolution is conspicuous at the boundary between the respective projected regions.

Further, for example, when the tiled display is performed by using a plurality of projectors in which keystone correction is made for respective image signals, there is also a risk that a difference in resolution is generated at the boundary between respective projected regions of the projectors and the boundary is conspicuous.

When the boundary is conspicuous due to the difference in projector resolution, the boundary can be made less conspicuous, for example, by reducing the resolution of the projector having the higher resolution. However, image quality in the projected region of the projector having the higher resolution degrades. As another example of solution, the boundary can be made less conspicuous by reducing the resolution only in a part of the projected region of the projector having the higher resolution, which is positioned near the boundary. However, image quality degrades near the boundary.

The present invention has been accomplished in view of the problems described above, and its object is to make the boundary between projected regions less conspicuous while reducing degradation of image quality when an image based on image data is displayed by using a plurality of projectors.

SUMMARY OF INVENTION

To solve the problems described above, an image processing apparatus of the present invention is constituted, by way of example, as follows. In an image processing apparatus for causing a plurality of projectors to project an image, the image processing apparatus includes an acquiring means, a specifying means, a smoothing means, and an output means. The acquiring means is for acquiring resolutions of the plurality of projectors and region information regarding projected regions of the plurality of projectors. The specifying means is for specifying a boundary between the projected regions of the projectors having different resolutions based on the resolutions of the plurality of projectors and the region information, which have been acquired by the acquiring means. The smoothing means is for executing smoothing such that pixels arrayed in a direction parallel to the boundary, which has been specified by the specifying means, are more strongly smoothed than pixels arrayed in a direction perpendicular to the boundary. In addition, the output means is for outputting image data that has been smoothed by the smoothing means.

Further features of the present invention will become apparent from the following description of exemplary embodiments with reference to the attached drawings.

BRIEF DESCRIPTION OF DRAWINGS

FIG. 7 is a block diagram representing a multi-projection system according to Embodiment 2.

DESCRIPTION OF EMBODIMENTS

Embodiment 1

Figure 1:
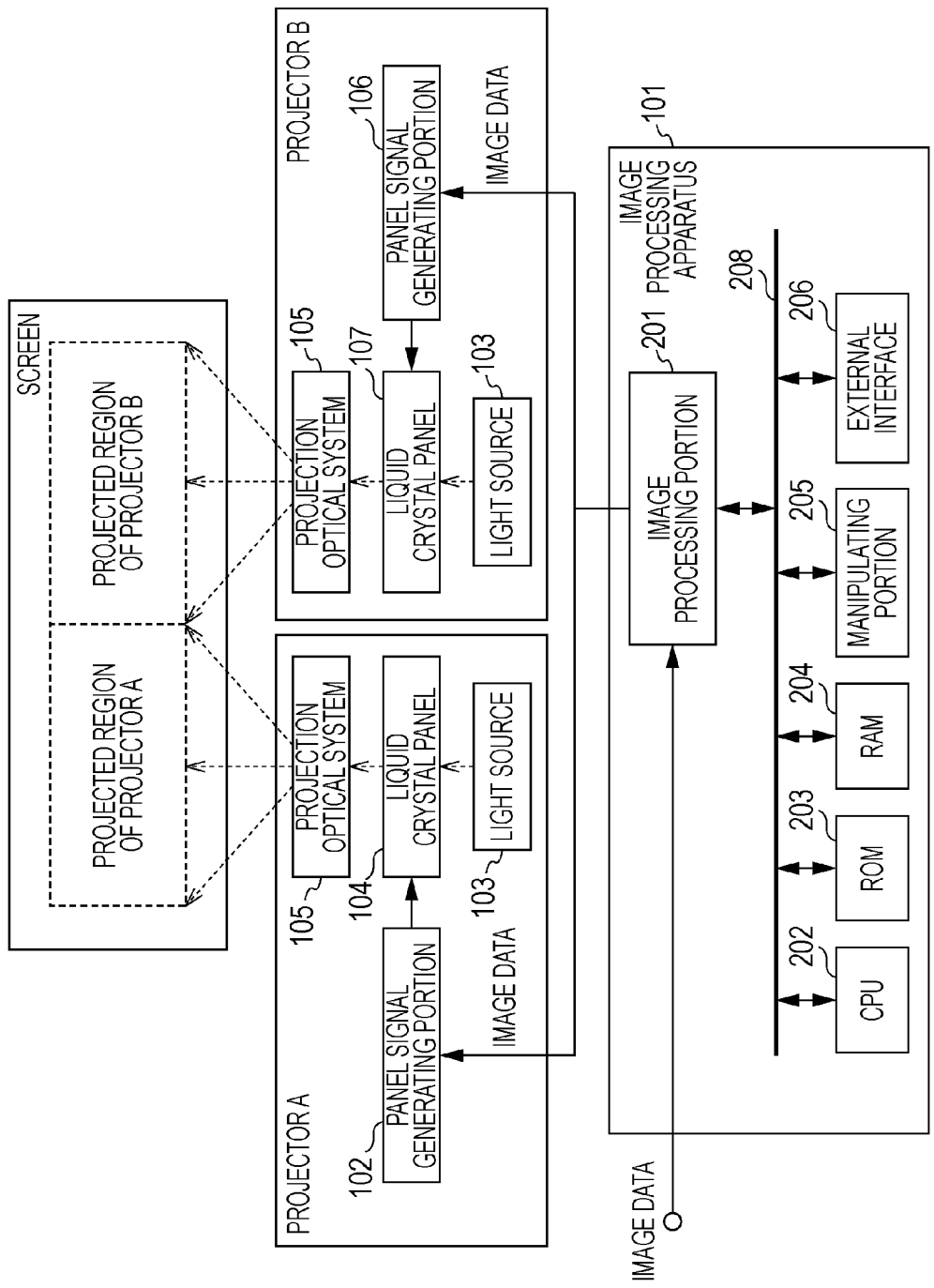
FIG. 1 is a block diagram representing a multi-projection system according to Embodiment 1.

The configuration for multi-projection in this embodiment will be described with reference to FIG. 1. This embodiment is described in connection with an example in which an image processing apparatus 101 causes two projectors A and B to perform tiled display.

The projector A is constituted by a panel signal generating portion 102, a light source 103, a liquid crystal panel 104, and a projection optical system 105. The panel signal generating portion 102 executes image processing on image data sent from the image processing apparatus 101 to generate control signals and outputs the control signals to the liquid crystal panel 104. The liquid crystal panel 104 is constituted by three panels of R/G/B, and their transmittances for the three primary colors R/G/B are two-dimensionally controlled in accordance with the control signals from the panel signal generating portion 102. Light projected from the light source 103 passes through the liquid crystal panel 104 that is controlled in accordance with the control signals generated by the panel signal generating portion 102.

The transmitted light having passed through the liquid crystal panel 104 passes through the projection optical system 105 and is projected onto a screen. The projection optical system 105 is constituted by a lens for projecting an image onto the screen in accordance with the transmitted light from the liquid crystal panel 104, a zoom portion for changing a field angle on the screen, a lens shift portion for changing a display position on the screen, etc. While the projector B has a similar configuration to that of the projector A, the projector B has a resolution three times higher than that of the projector A. Accordingly, the resolution to be controlled in a panel signal generating portion 106 and a liquid crystal panel 107 of the projector B is higher than that in the panel signal generating portion 102 and the liquid crystal panel 107 of the projector A.

Next, the image processing apparatus 101 according to this embodiment is described. The image processing portion 201 is a circuit for receiving the image data, executing image processing (filtering process) for the boundary between the respective projected regions of the projectors used for the tiled display, and outputting the image data after the filtering process to the projectors. As an alternative, a CPU 202 included in the image processing apparatus 101 may read a program, which is recorded in a ROM 203, into a RAM 204 and may execute the above-mentioned filtering process, as required. In such a case, the ROM 203 and the RAM 204 provide programs, data, and work areas, which are necessary to execute the filtering process in this embodiment, to the CPU 202. The filtering process executed by the image processing apparatus 101 according to this embodiment is a smoothing process for smoothing pixel values within a filtering region. The smoothing process in this embodiment is executed by using a mean value filter. However, the smoothing process may be executed by using a higher-frequency component cut filter for cutting higher-frequency components in the filtering region, or a central value filter that employs a pixel value at a center of the filtering region.

Also, the image processing apparatus 101 includes a manipulating portion 205 for inputting an instruction from a user. The manipulating portion 205 can be realized with buttons or a touch panel, for example. The image processing apparatus 101 further includes an external interface 206 for connection to a PC, a camera, and media (such as a hard disk, a memory card, an SD card, and a USB memory). The external interface 206 can be realized with, e.g., a communication line in conformity with standards, such as USB, LAN or IEEE1394, or realized with wireless communication.

The image processing portion 201 in this embodiment executes the filtering process (smoothing process) to make the boundary between respective projected regions of the projectors having different resolutions less conspicuous by utilizing visual characteristics of the user. More specifically, there are such visual characteristics that the resolution difference in the direction parallel to a boundary line between two regions differing in resolution from each other more greatly contributes to recognition of the boundary line than the resolution difference in the direction perpendicular to the boundary line. In consideration of those visual characteristics, the image processing portion 201 executes the filtering process (smoothing process) of the image data such that pixels arrayed in the direction parallel to the boundary between the projected regions of the projectors having different resolutions are more strongly smoothed than pixels arrayed in the direction perpendicular to the boundary therebetween. That type of filtering process is executed as a process of, with the aid of a filter, reducing the resolution of the image data, which is output to the projector having the higher resolution (i.e., the projector B), to be matched with the resolution of the projector A having the lower resolution. Thus, the image processing portion 201 in this embodiment executes the filtering process for the pixels arrayed in the direction that does not greatly contribute to recognition of the boundary line (i.e., in the direction perpendicular to the boundary line), at a weaker level than the filtering process for the pixels arrayed in the direction that greatly contributes to recognition of the boundary line (i.e., in the direction parallel to the boundary line). As a result, the boundary between the projected regions of the projectors can be made less conspicuous while suppressing degradation of image quality.

Figure 2:
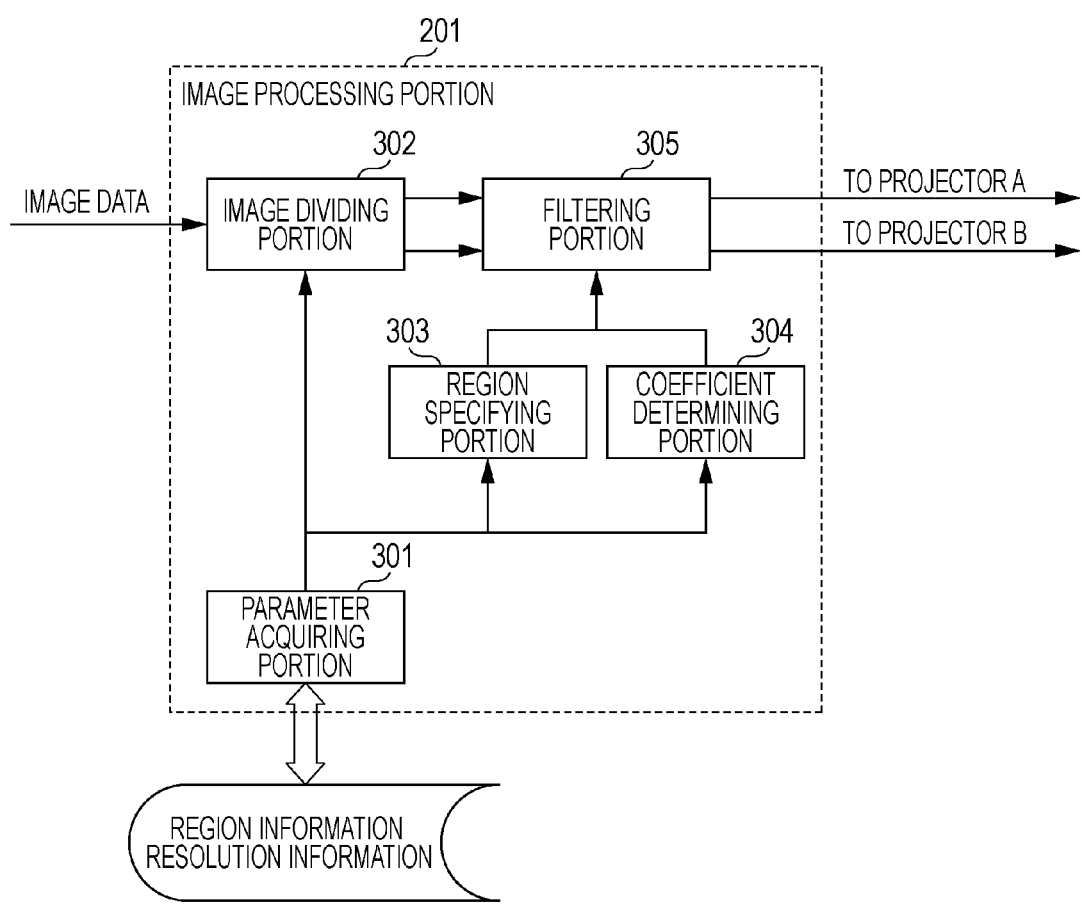
FIG. 2 is a block diagram of an image processing portion 201 in Embodiment 1.

Details of the image processing portion 201 are illustrated in FIG. 2. The image processing portion 201 includes a parameter acquiring portion 301, an image dividing portion 302, a region specifying portion 303, a coefficient determining portion 304, and a filtering portion 305. The parameter acquiring portion 301 acquires region information regarding respective positions of the projected regions of the projectors used for the tiled display, and respective resolutions of the projectors used for the tiled display.

The image dividing portion 302 divides the image data, which has been input to the image processing apparatus 101, based on the region information of each projector. The region specifying portion 303 specifies the boundary between the projected regions of the projectors having different resolutions based on the region information and the resolution of each projector, which have been acquired by the parameter acquiring portion 301, and then determines, based on the specified result, the filtering region where the filtering process is to be executed.

The coefficient determining portion 304 determines a filter coefficient (smoothing parameter) used in the filtering process. The filtering portion 305 executes the filtering process for the filtering region, which has been specified by the region specifying portion 303, in accordance with the filter coefficient (smoothing parameter) determined by the coefficient determining portion 304.

The operation of the image processing apparatus 201 will be described below with reference to a flowchart of FIG. 3.

In step S301 (acquisition procedure), the parameter acquiring portion 301 acquires the region information of each of the projectors used for the tiled display. The region information implies information for specifying the positional relationship between respective projected regions of the projectors in the multi-projection. In the case of the tiled display illustrated in FIG. 1, for example, the region information acquired by the parameter acquiring portion 301 is given as information representing that, in the configuration in which the projected regions of two projectors are arrayed side by side, the projector A projects an image to the projected region on the left side and the projector B projects an image to the projected region on the right side. Further, the region information includes information regarding the size of the projected region of each projector. The parameter acquiring portion 301 in this embodiment acquires the region information based on details of setting, which have been set by the user through the manipulating portion 205.

For example, the user inputs the number of projectors used for the tiled display and selects a configuration pattern of the tiled display. Further, the user designates the projector for each of the projected regions corresponding to the selected configuration pattern. The parameter acquiring portion 301 acquires the region information based on both the configuration pattern of the tiled display, which has been selected by the user, and the projector designated for each of the projected regions.

In the case of FIG. 1, for example, "2" is input as the number of projectors, and a configuration pattern in which the projected regions are arrayed side by side is selected as the configuration pattern of the tiled display. Further, in the configuration pattern in which the projected regions are arrayed side by side, the projector A is designated as the projector that projects an image to the projected region on the left side, and the projector B is designated as the projector that projects an image to the projected region on the right side. The parameter acquiring portion 301 in this embodiment acquires the region information based on the above-mentioned user inputs (designation information inputs).

Stated another way, the parameter acquiring portion 301 acquires the region information regarding the projected regions of the plural projectors based on the designation information input through the manipulating portion 205.

As an alternative, the parameter acquiring portion 301 in this embodiment may acquire the region information based on an image picked up by a CCD sensor camera that is connected to the image processing apparatus through the external interface 206. More specifically, the CCD sensor camera picks up respective images of the projected regions of the projectors. By receiving the images picked up by the CCD sensor camera, the parameter acquiring portion 301 can acquire the region information regarding the projected regions of the plural projectors. With such a modification, the region information can be acquired even when the user does not input the configuration pattern of the tiled display. In addition, the parameter acquiring portion 301 in this embodiment changes a manner of acquiring the region information so as to acquire the region information based on the picked-up image when the region information cannot be acquired from the user inputs. As a result, the region information can be acquired with higher reliability.

In step S302 (acquisition procedure), the parameter acquiring portion 301 acquires respective resolutions of the projectors A and B. The parameter acquiring portion 301 in this embodiment receives notices indicating the respective resolutions from the projectors A and B via display cables. The parameter acquiring portion 301 acquires the respective resolutions of the plural projectors based on the notices sent from the plural projectors.

Further, the parameter acquiring portion 301 in this embodiment may calculate the resolution of each projector from the image picked up by the camera that is connected to the image processing apparatus through the external interface 206. With such a modification, the parameter acquiring portion 301 can acquire the resolution of each projector even when the projector does not have the function of notifying its resolution. In addition, the parameter acquiring portion 301 in this embodiment changes a manner of acquiring the resolution so as to acquire the resolution based on the picked-up image when the resolution cannot be acquired based on the notice sent from the projector. As a result, the resolution of each projector can be acquired with higher reliability.

In step S303, the image dividing portion 302 divides the image data based on the region information of the projectors, which has been acquired by the parameter acquiring portion 301. In this embodiment, as illustrated in FIG. 1, the projected regions of the projectors A and B are arrayed side by side in the left-and-right direction so as to perform the tiled display, and the projected regions have the same size. Therefore, the image dividing portion 302 horizontally divides the input image data into the same size as viewed in the left-and-right direction. It is here assumed that the projected regions of the projectors A and B are coupled in a state not overlapping with each other.

In step S304 (specifying procedure), the region specifying portion 303 specifies the filtering region based on the region information and the resolutions, which have been acquired by the parameter acquiring portion 301. More specifically, in step S304, the region specifying portion 303 specifies the boundary between the projected regions of the projectors having different resolutions based on the resolutions and the region information of the plural projectors. Further, the region specifying portion 303 specifies the region for which the filtering process to make the specified boundary less conspicuous is executed (i.e., the filtering region). The filtering process is executed on the image data that has been divided corresponding to the projector having the higher resolution. Stated another way, in this embodiment, the region specifying portion 303 specifies, as the filtering region, at least a part of the region of the image data that is output to the projector B having the higher resolution than the projector A.

The region specifying portion 303 in this embodiment specifies a width of the filtering region based on the difference between the resolutions of the projectors. More specifically, when the difference in resolution between the projectors on both the sides of the boundary is larger than a predetermined difference, the region specifying portion 303 sets the width of the filtering region to be larger than that set when the difference in resolution is smaller than the predetermined difference. With such setting, when the difference in resolution is large, the resolution is more smoothly changed, and therefore the boundary can be made less conspicuous. On the other hand, when the difference in resolution is small, the width of the filtering region is set to be relatively small, and therefore a processing load of the filtering process can be reduced.

For example, when the resolution of the projector B is three times the resolution of the projector A, the region specifying portion 303 specifies 30% of the projected region of the projector B as the filtering region. In other words, a part of the projected region of the projector B, which corresponds to 30% thereof as measured from the boundary with respect to the projected region of the projector A, is specified as the filtering region. Meanwhile, when the resolution of the projector B is twice the resolution of the projector A, the region specifying portion 303 specifies 20% of the projected region of the projector B as the filtering region. Alternatively, the width of the filtering region may be held constant. Further, the region specifying portion 303 may specify the width of the filtering region based on a distance through which an image is observed, or details of the image.

In step S305 (determination procedure), the coefficient determining portion 304 determines the filter coefficient (smoothing parameter), which is used in the filtering process, based on both the direction of the boundary and the filtering region, which have been specified by the region specifying portion 303. The coefficient determining portion 304 in this embodiment determines the filter coefficient such that the pixels arrayed in the direction parallel to the boundary is more strongly smoothed than the pixels arrayed in the direction perpendicular to the boundary.

Figure 4A:
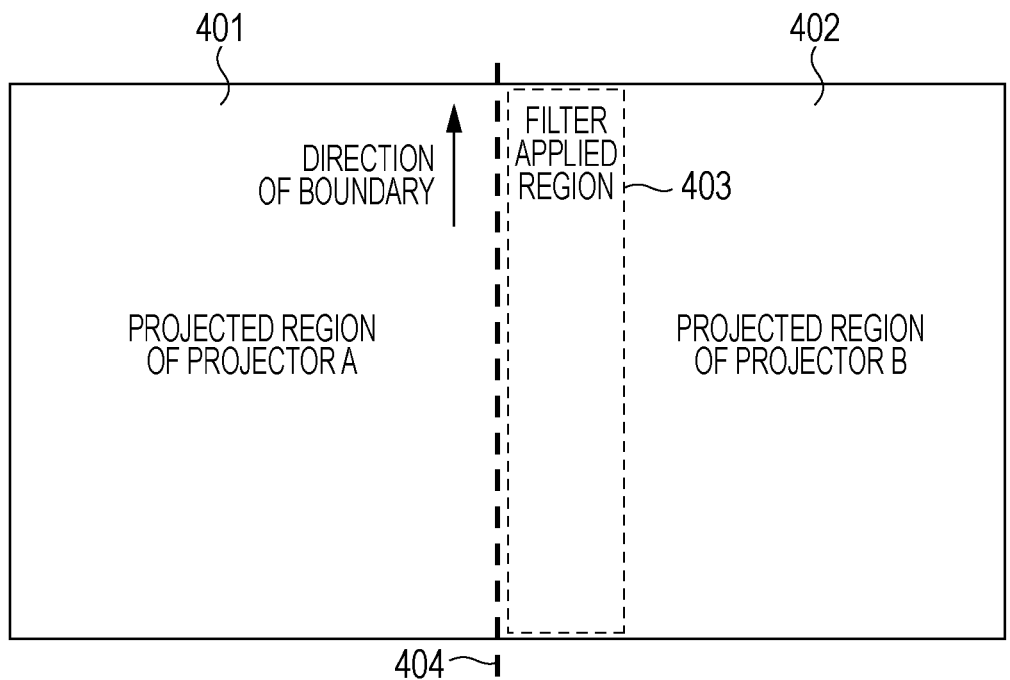
FIGS. 4A and 4B are each an illustration to explain a boundary region and a filtering process in Embodiment 1.
Figure 4B:
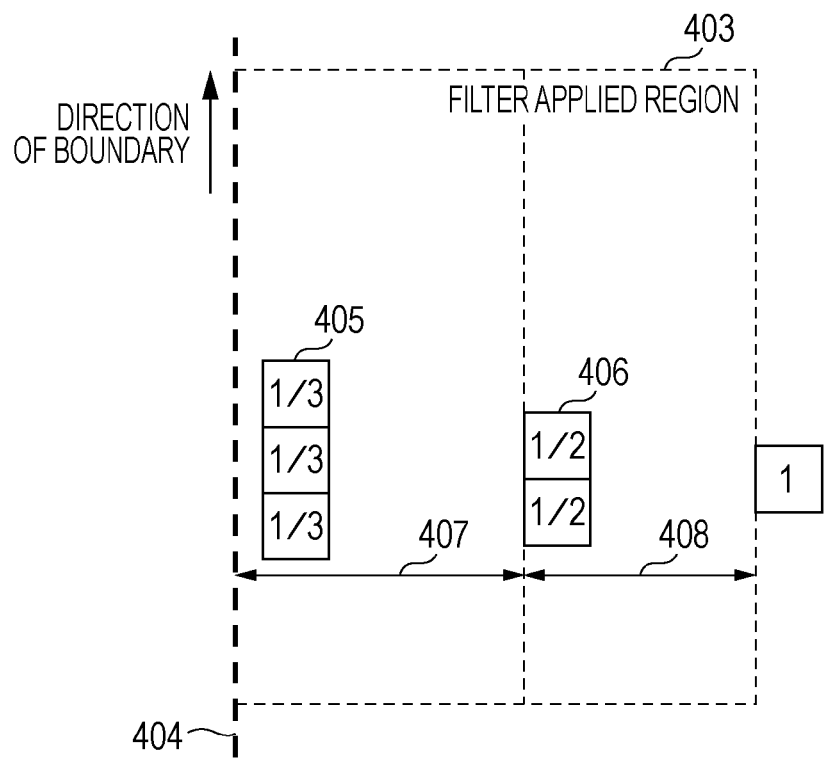

FIGS. 4A and 4B are each an illustration to explain, by way of example, a method of determining the filter coefficient by the coefficient determining portion 304. FIG. 4A illustrates an example in which the tiled display is performed by arraying a projected region 401 of the projector A having the lower resolution and a projected region 402 of the projector B having the higher resolution side by side. In such a case, the region specifying portion 303 specifies, as the filtering region, at least a part (i.e., a filter applied region 403) of the projected region 402 of the projector B having the higher resolution. Numeral 404 indicates a boundary line between the projected region 401 of the projector A and the projected region 402 of the projector B.

FIG. 4B illustrates, in an enlarged scale, the filter applied region 403 illustrated in FIG. 4A. As illustrated in FIG. 4B, the coefficient determining portion 304 determines a filter A 405, which takes a mean of three pixel values, as the filter coefficient for a region 407 in the filter applied region 403, which is positioned nearer to the boundary 404. Also, the coefficient determining portion 304 determines a filter B 406, which takes a mean of two pixel values, as the filter coefficient for a region 408 in the filter applied region 403, which is positioned farther away from the boundary 404 than the region 407. Thus, the coefficient determining portion 304 determines the filter coefficient such that pixels in the filtering region nearer to the boundary line are more strongly smoothed than pixels in the filtering region farther away from the boundary line.

Stated another way, the coefficient determining portion 304 determines the smoothing parameter such that those ones of pixels in the projected region of the projector B, which are each located at a second distance from the boundary between the projected regions of the projectors A and B, are more strongly smoothed than those ones of the relevant pixels, which are each located at a first distance that is longer than the second distance. Be it noted that the projector B has the higher resolution than the projector A.

Further, the coefficient determining portion 304 in this embodiment determines the filter coefficient such that the filtering process is executed on the pixels arrayed in the direction parallel to the direction of the boundary, but the filtering process is not executed on the pixels arrayed in the direction perpendicular to the direction of the boundary. Thus, the coefficient determining portion 304 determines the filter coefficient such that smoothing of the pixels arrayed in the direction parallel to the direction of the boundary is more strongly performed than smoothing of the pixels arrayed in the direction perpendicular to the direction of the boundary. While this embodiment is described in connection with an example in which the smoothing of the pixels arrayed in the direction perpendicular to the direction of the boundary is not performed, those pixels may be more weakly smoothed than the pixels arrayed in the direction parallel to the direction of the boundary.

Change of the resolution resulting from the filtering process in this embodiment will be described with reference to FIGS. 5A to 5E. Each of FIGS. 5A to 5E represents the relationship between the resolution of each projector and the coordinate in the direction (x direction) perpendicular to the boundary line. The resolution represented in FIGS. 5A to 5E is a value corresponding to a maximum spatial frequency that is available for the projected image. As that value increases, an image having a higher resolution can be projected.

Figure 5A:
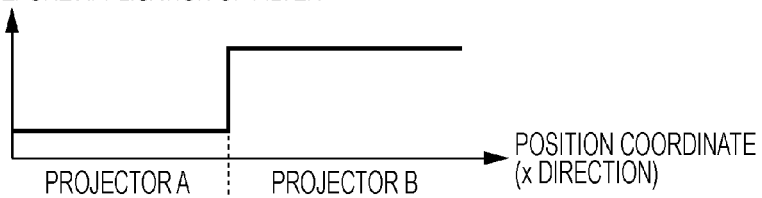
FIGS. 5A to 5E are each an illustration to explain the filtering process in Embodiment 1.
Figure 5B:
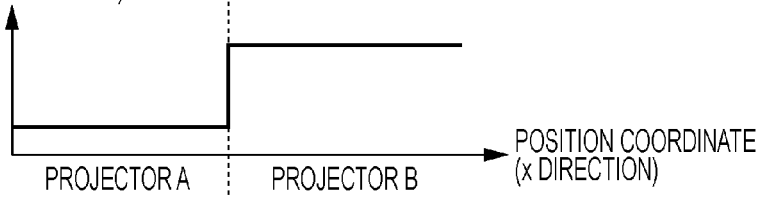

FIG. 5A represents the resolution before the filtering process. An abrupt change of the resolution between the projectors A and B is present at a boundary line 601, and the boundary line 601 is in a conspicuous state. FIG. 5B represents the resolution after the filtering process in the direction perpendicular to the boundary line. Because the resolution in the direction perpendicular to the boundary line does not so contribute to the recognition of the boundary line, the resolution in the perpendicular direction on the same side as the projector B is not reduced or is slightly reduced. As illustrated in FIG. 5B, therefore, the change of the resolution after the filtering process in the direction perpendicular to the boundary line remains large.

Figure 5C:
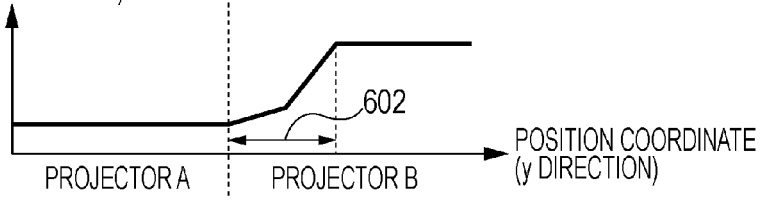

FIG. 5C represents the resolution after the filtering process in the direction parallel to the boundary line. As described above, the difference in resolution in the direction parallel to the boundary line affects the recognition of the boundary line to a larger extent than the difference in resolution in the direction perpendicular to the boundary line. Accordingly, the coefficient determining portion 304 determines the filter coefficient such that, in the projected region of the projector B nearer to the boundary, the resolution in the direction parallel to the direction of the boundary becomes close to the resolution of the projector A. Further, the coefficient determining portion 304 gradually increases the resolution of the projector B in the direction parallel to the boundary line as a distance from the boundary line increases, and then sets it to the same value as the original resolution of the projector B in a region away from the boundary line in excess of a filtering region width 602.

Figure 5D:
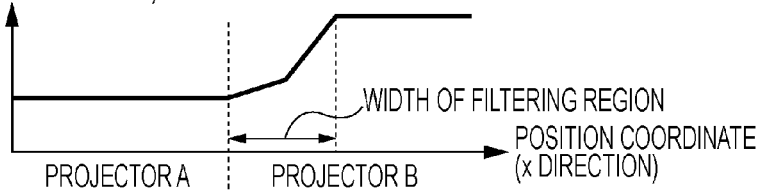
Figure 5E:
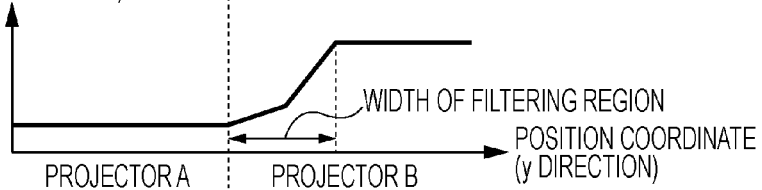

FIGS. 5D and 5E represent respectively the resolution in the x direction and the resolution in the y direction when the filtering process is executed regardless of direction. On the other hand, because the image processing portion 201 in this embodiment holds the resolution in the direction perpendicular to the direction of the boundary, i.e., in the x direction, as it is, the resolution in the filtering region remains at a higher level in comparison with the case where the filtering process is executed regardless of direction.

The methods of determining the filtering region and the filter coefficient are not limited to the above-described ones. Thus, it is just required that the pixel values in the direction parallel to the boundary line are more strongly smoothed than the pixel values in the direction perpendicular to the boundary line.

In step S306 (smoothing procedure), the filtering portion 305 executes the filtering process (smoothing process) by using both the filtering region, which has been specified in step S304, and the filter coefficient, which has been determined in step S305. More specifically, in step S306, the filtering portion 305 executes the smoothing process such that the pixels arrayed in the direction parallel to the boundary is more strongly smoothed than the pixels arrayed in the direction perpendicular to the boundary. As the filtering process, the filtering portion 305 executes convolution integral of the original image data by using the filter coefficient.

In step S307 (output procedure), the filtering portion 305 outputs the image data after the filtering process to the projectors. Because the image processing apparatus 101 according to this embodiment is described as an apparatus separate from the projectors A and B, the filtering portion 305 outputs the image data to the projectors A and B. However, when the image processing apparatus 101 is incorporated in the projector A, for example, the filtering portion 305 outputs the image data to the projector B and to, e.g., the panel signal generating portion 102 in the projector A. In other words, the filtering portion 305 outputs the image data after the filtering process to at least one of the plural projectors that are used to perform the multi-projection.

Figure 3:
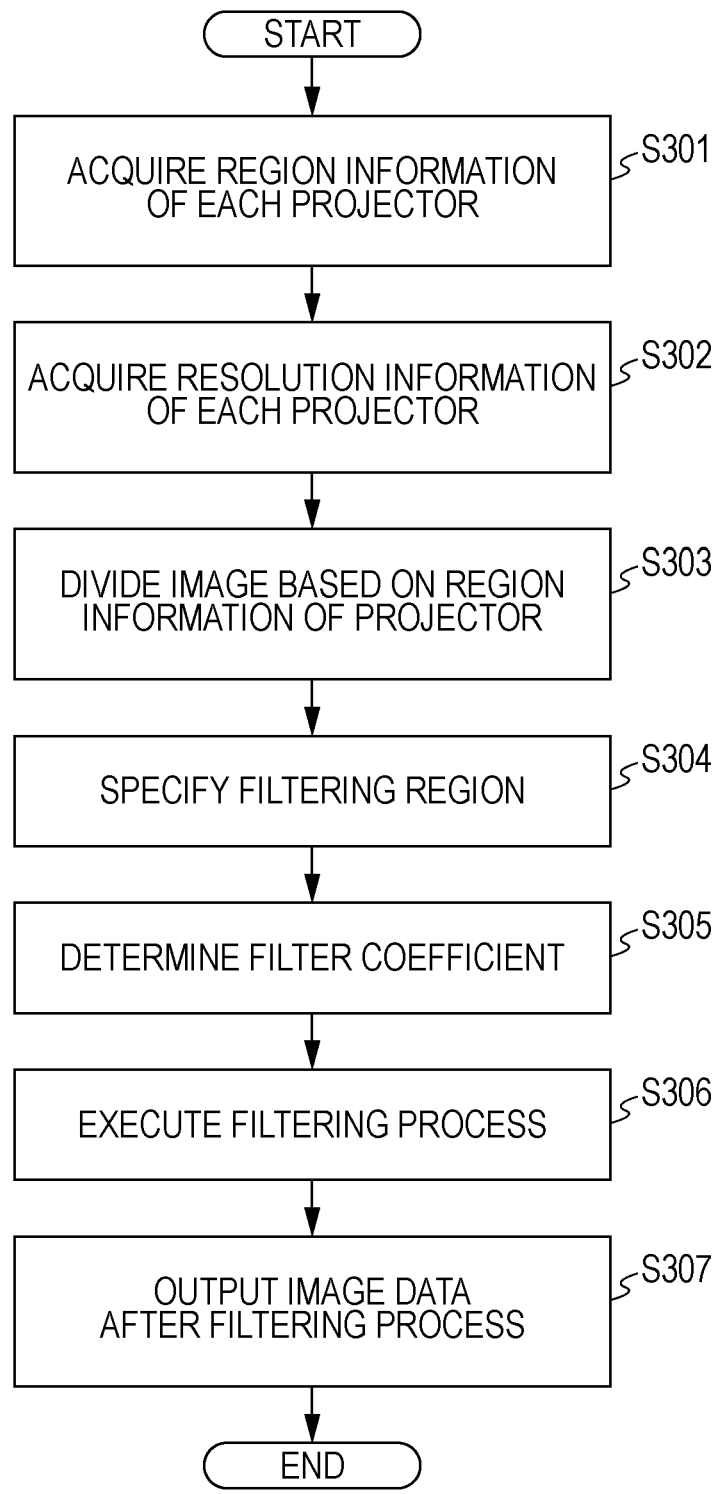
FIG. 3 is a flowchart representing processing executed in an image processing apparatus 101 in Embodiment 1.

Part of the steps in FIG. 3 may be executed by using the function of, e.g., an OS (Operating System) or a known application.

Figure 6A:
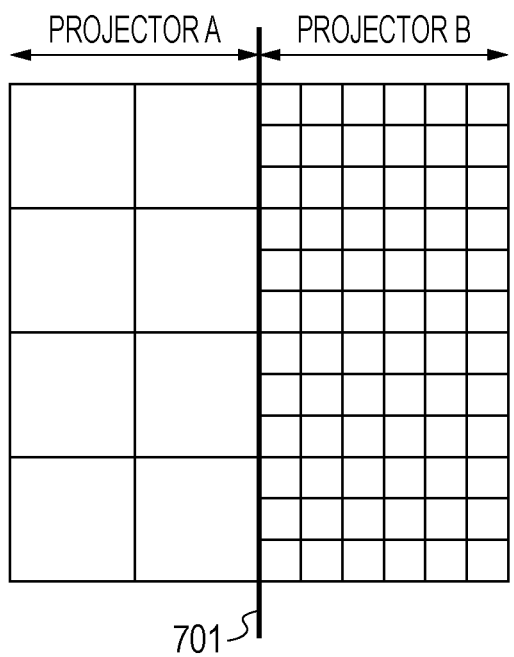
FIGS. 6A and 6B are each an illustration to explain pixel shapes in the filtering process in Embodiment 1.
Figure 6B:
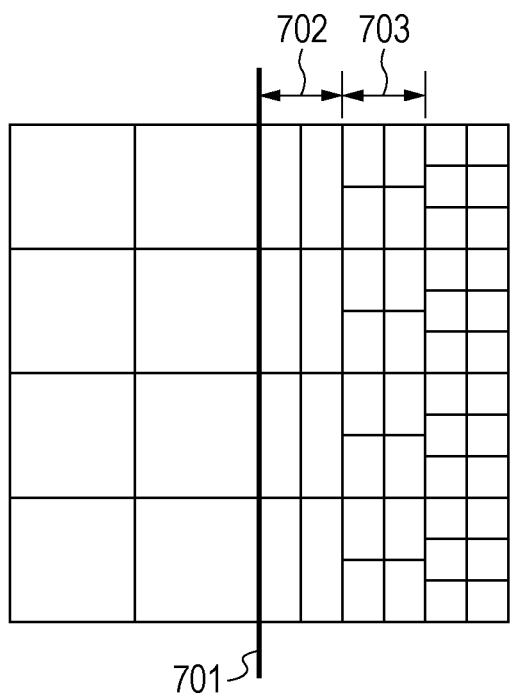

Next, a result of the image processing executed for the boundary line in accordance with the filtering process is described with reference to FIGS. 6A and 6B. FIG. 6A represents the resolution before the filtering process near the boundary line between the projectors A and B. One square corresponds to one pixel. FIG. 6A indicates that the resolution is abruptly changed on both the sides of a boundary line 701. FIG. 6B indicates the resolutions of the projectors A and B after the filtering process near the boundary line. A region 702 represents a region to which the filter A determined in step S305 is applied, and a region 703 represents a region to which the filter B is applied. The filtering process (smoothing process) in this embodiment is executed by using a mean value filter. Be it noted that the smoothing process may be executed by using a higher-frequency component cut filter or a central value filter.

As illustrated in FIG. 6B, the resolution of the projector B after the filtering process near the boundary line is reduced as a result of the filtering process. In particular, the resolution in the direction parallel to the direction in which the boundary line extends is reduced in comparison with the resolution in the direction perpendicular to the direction of the boundary line. Thus, according to the image processing apparatus 101 of this embodiment, an image with a high resolution in the direction perpendicular to the direction of the boundary line can be projected while the boundary between the projected regions of the projectors having the different resolutions can be made less conspicuous.

In this embodiment, the filtering process is described in connection with the case where the projectors A and B project the projected regions arrayed side by side in the left-and-right direction to perform the tiled display, as illustrated in FIG. 1. However, embodiments are not limited to the above-described one, and the filtering process can also be applied to the case where the projected regions of the projectors are displayed in an overlapped relation.

According to the image processing apparatus of this embodiment, as described above, in the tiled display using a plurality of projectors having different resolutions, the boundary between the projected regions can be made less conspicuous while reducing degradation of image quality.

While the image processing apparatus of this embodiment is described in connection with an example in which the multi-projection is performed by using a plurality of projectors having different resolutions, embodiments are not limited to the above-described one. The present invention can be further applied to the case where the multi-projection is performed by using a plurality of projectors having the same resolution, but having different field angles, or the case where the multi-projection is performed by using a projector in which the keystone correction is executed and a projector in which the keystone correction is not executed.

When the field angle is employed, the parameter acquiring portion 301 acquires information regarding the resolution and the field angle from each projector in step S302 of FIG. 3. Further, in step S304, the region specifying portion 303 specifies the boundary between the projected regions where the resolutions differ from each other, based on the resolutions, the region information, and the field angles, and then specifies the filtering region based on the specified result. For example, when the projectors have the same resolution, the resolution of the projector having a smaller field angle becomes relatively high. Accordingly, in step S305, the coefficient determining portion 304 determines the filter coefficient (smoothing parameter) such that pixels arrayed in the direction parallel to the boundary between the projected region of the projector having the smaller field angle and the projected region of the projector having the larger field angle are more strongly smoothed than pixels arrayed in the direction perpendicular to the boundary.

When a correction amount for the keystone correction is employed, the parameter acquiring portion 301 acquires information regarding the resolution and the correction amount for the keystone correction from each projector in step S302 of FIG. 3. Further, in step S304, the region specifying portion 303 specifies the boundary between the projected regions where the resolutions differ from each other, based on the resolutions, the correction amounts for the keystone correction, and the region information, and then specifies the filtering region based on the specified result. As an alternative, the image processing apparatus 101 may specify the filtering region and determine the filter coefficient by employing both the field angle and the correction amount for the keystone correction.

Embodiment 2

Embodiment 2 is described primarily about different points in comparison with Embodiment 1. FIG. 7 is a block diagram to explain the configuration of multi-projection in Embodiment 2. This embodiment is described in connection with the case where a projected region 1002 of a projector B is surrounded by a projected region 1001 of a projector A. Be it noted that the projectors A and B in this embodiment are the same as the projectors A and B in Embodiment 1.

Figure 8:
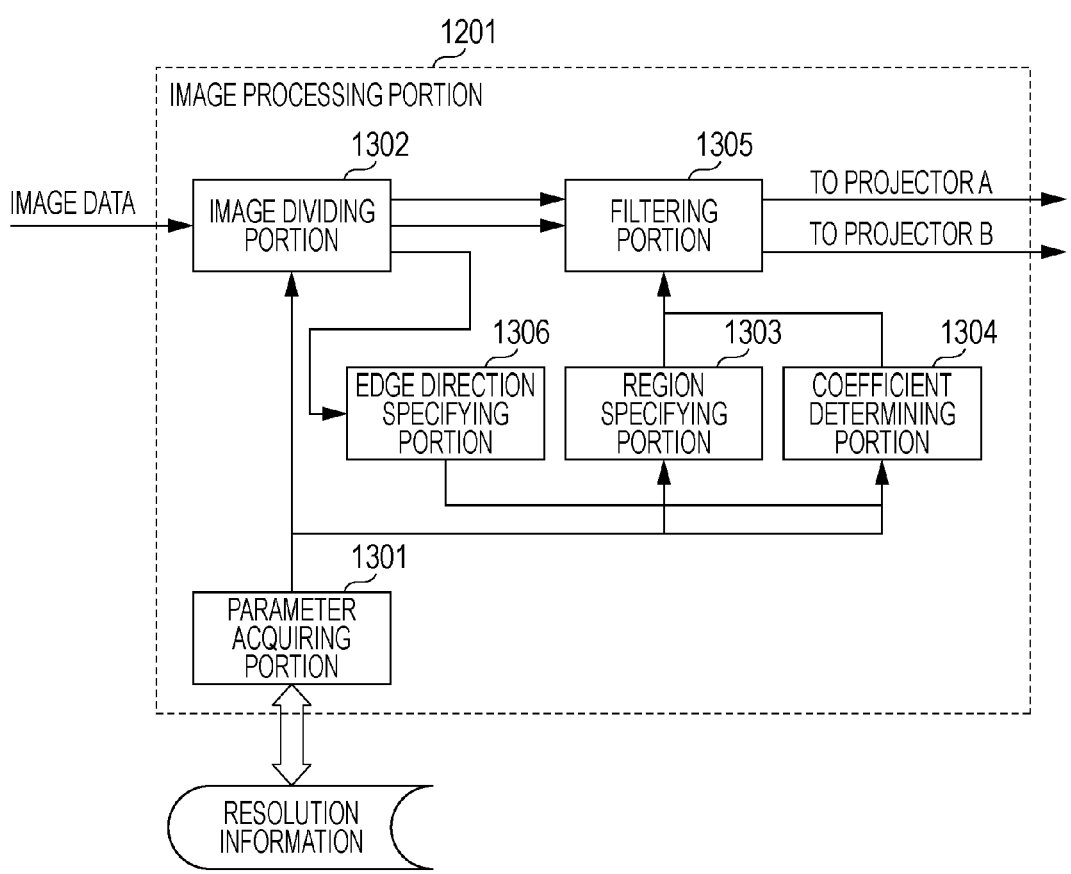
FIG. 8 is a block diagram of an image processing portion 1201 in Embodiment 2.

FIG. 8 is a block diagram illustrating the configuration of an image processing portion 1201 in Embodiment 2. While the image processing portion 201 in Embodiment 1 acquires the region information based on the user inputs or the picked-up image, the image processing portion 1201 in this embodiment acquires the region information based on the image data that is output from an image dividing portion 1302 to a filtering portion 1305.

More specifically, the image dividing portion 1302 divides the image data based on information regarding the projected region, which is acquired from each projector, and further acquires the region information by using the divided image data. For example, in FIG. 7, the image dividing portion 1302 acquires the projected region information notifying that the projector A projects a region 1001 and the projector B projects a region 1002. In an example of FIG. 7, the projected region information acquired by the image dividing portion 1302 includes coordinate values of four apexes for specifying the region 1001, coordinate values of a center of the region 1002, and a radius of the region 1002. The projected region information further includes correspondence information for making the region 1001 and the projector A correspondent to each other, and correspondence information for making the region 1002 and the projector B correspondent to each other.

The image dividing portion 1302 having acquired the above-mentioned projected region information divides the input image data into image data for the projector A and image data for the projector B.

An edge direction specifying portion 1306 specifies both the boundary between the projected regions where the resolutions differ from each other and the direction of the boundary based on the divided image data that has been output from the image dividing portion 1302. Processing executed by the edge direction specifying portion 1306 will be described below.

Figure 9A:
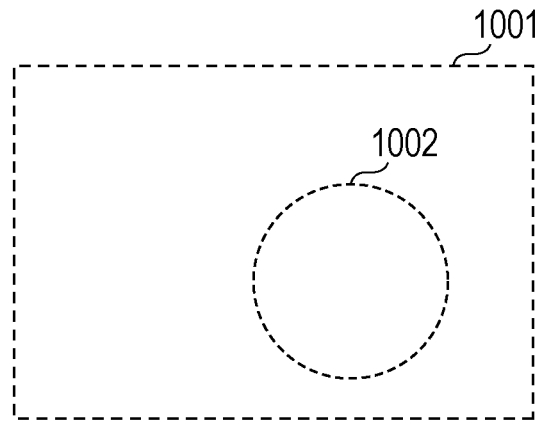
FIGS. 9A to 9C are each an illustration to explain division of an image, which is executed by an image dividing portion in Embodiment 2.
Figure 9B:
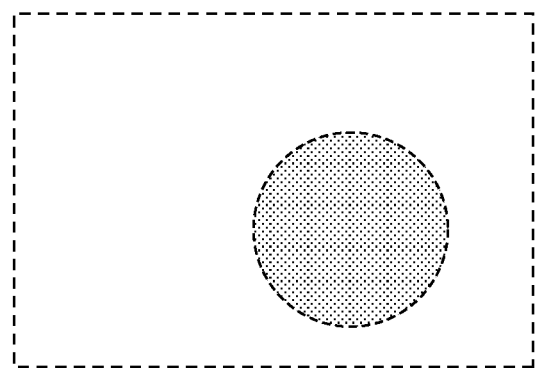
Figure 9C:
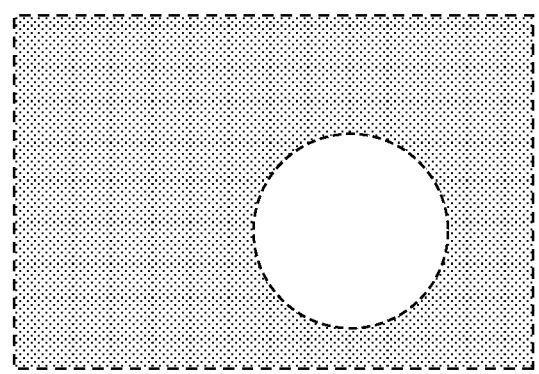

FIGS. 9A to 9C illustrate an example of an image divided by the image dividing portion 1302. FIG. 9A illustrates a projected region in which the projected regions of two projectors are combined with each other. The region 1001 represents the projected region of the projector A, and the region 1002 represents the projected region of the projector B. A white region in FIG. 9B represents a region of the image data that is output from the image dividing portion 1302 for the projector A. Also, a white region in FIG. 9C represents a region of the image data that is output from the image dividing portion 1302 for the projector B. The image dividing portion 1302 outputs the image data such that pixel value data for each of the white regions, illustrated in FIGS. 9B and 9C, take values corresponding to the input image data and pixel value data for each of the black regions become 0. The edge direction specifying portion 1306 specifies the boundary between the projected regions where the resolutions differ from each other and the direction of the boundary based on both the image data output from the image dividing portion 1302 and the resolutions acquired by the parameter acquiring portion 1301. As an alternative, the edge direction specifying portion 1306 may acquire the resolutions from the image data that is output from the image dividing portion 1302.

The edge direction specifying portion 1306 in this embodiment specifies the boundary between the projected regions where the resolutions differ from each other and the direction of the boundary in accordance with the following method.

The edge direction specifying portion 1306 calculates differential amounts in the x and y directions for an arbitrary pixel P(x, y) in the region 1001:

$$fx = P(x+1, y) - P(x, y) \quad (1)$$

$$fy = P(x, y+1) - P(x, y) \quad (2)$$

Next, the edge direction specifying portion 1306 calculates intensity I at an edge of the image according to the following formula.

$$I(x, y) = \sqrt{(fx \times fx + fy \times fy)} \quad (3)$$

Next, the edge direction specifying portion 1306 compares the edge intensity calculated according to the formula (3) with a threshold I0.

In the case of I(x, y)>I0, the edge direction specifying portion 1306 determines that the pixel P(x, y) represents an edge portion. On the other hand, in the case of I(x, y)<=I0, the edge direction specifying portion 1306 determines that the pixel P(x, y) does not represent an edge portion.

Subsequently, the edge direction specifying portion 1306 calculates an edge direction. The edge direction at the pixel P(x, y) is defined by;

$$\theta = \arctan(fy/fx) \quad (4)$$

Figure 10A:
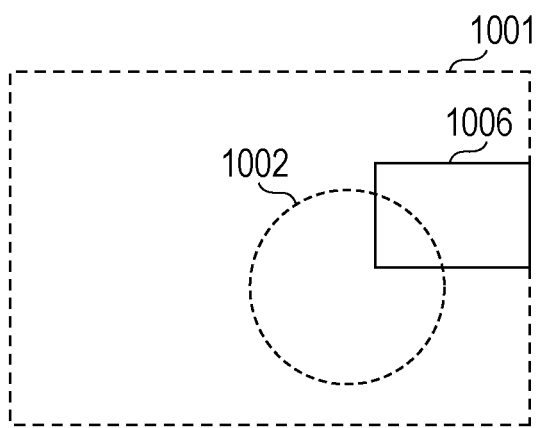
FIGS. 10A and 10B are each an illustration representing a tangential line and an angle with respect to a boundary region in Embodiment 2.
Figure 10B:
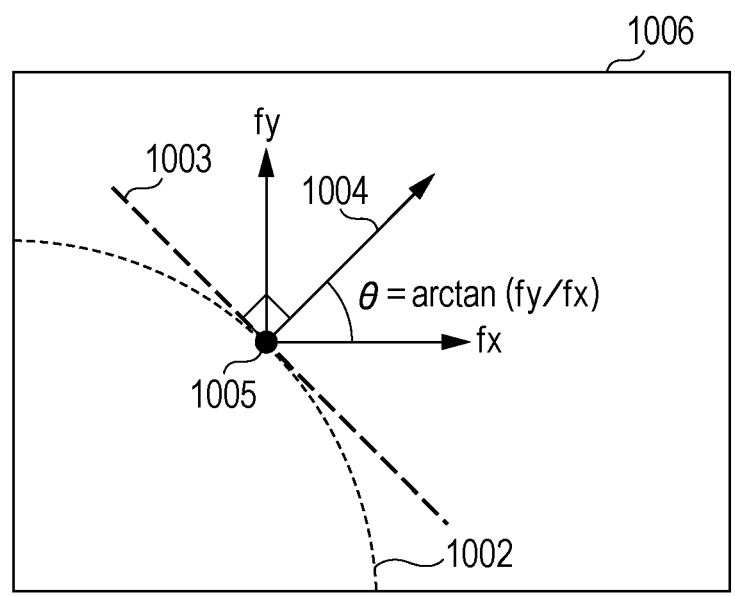

The relationship between a boundary at the edge and θ is described with reference to FIGS. 10A and 10B. FIG. 10A illustrates the projected region in which the projected regions of the projectors A and B are combined with each other, as in FIG. 9A. FIG. 10B illustrates, in an enlarged scale, a region 1006 in FIG. 10A. A line tangential to the boundary between the regions 1001 and 1002 at a certain pixel 1005 is provided by a tangential line 1003. Angle information θ is calculated as an angle formed with respect to the direction perpendicular to the tangential line, i.e., to the boundary line. The edge direction specifying portion 1306 in this embodiment executes the above-described calculations for all pixels in the region 1001.

The edge direction specifying portion 1306 outputs the angle information θ to the coefficient determining portion 1304. The coefficient determining portion 1304 determines the filter coefficient (smoothing parameter) by using the angle information θ. More specifically, the coefficient determining portion 1304 determines the smoothing parameter such that pixels arrayed in the direction parallel to the direction of the boundary are more strongly smoothed than pixels arrayed in the direction perpendicular to the direction of the boundary. The coefficient determining portion 1304 in this embodiment previously stores the optimum filter coefficient for each value of the angle information θ. Then, the coefficient determining portion 1304 determines the filter coefficient in accordance with both the acquired angle information θ and the filter coefficient stored in advance. Be it noted that a method of determining the filter coefficient is not limited to the above-described one.

According to the image processing apparatus of this embodiment, as described above, when an image based on image data is displayed by using a plurality of projectors, the boundary between the projected regions can be made less conspicuous while reducing degradation of image quality.

While this embodiment is described in connection with the image processing apparatus in which projectors each projecting an image onto a screen from the front surface side displays the image, the present invention can also be applied to, e.g., a rear projection television, etc. Further, while this embodiment is described in connection with the case where the image processing apparatus is separate from a projector, the image processing apparatus may be incorporated in the projector.

Embodiment 3

The first embodiment and the second embodiment have been described in connection with the case of using two projectors, the present invention can also be applied to the case of using three or more projectors. This embodiment is described in connection with the case where the multi-projection is performed by using four projectors (i.e., projectors A, B, C and D). For example, the projector D (fourth projector) projects an image onto the projected region of the projector A (first projector) in FIG. 1, and the projector C (third projector) projects an image onto the projected region of the projector B (second projector) in FIG. 1. The resolution of the projector B is highest and the resolutions of the other projectors decrease in the order of the projectors A, C and D.

In such an example, the filtering process is executed on a part of the projected region of the projector B, which is positioned near the boundary with respect to the projected region of the projector A, and on a part of the projected region of the projector B, which is positioned near the boundary with respect to the projected region of the projector C. Accordingly, two pixel values are calculated for one pixel in the part (upper left corner) of the projected region of the projector B. More specifically, those two pixel values calculated are a first pixel value obtained with the filtering process, which is executed depending on the direction of the boundary between the projected regions of the projectors A and B, and a second pixel value obtained with the filtering process, which is executed depending on the direction of the boundary between the projected regions of the projectors B and C. When two or more pixel values are calculated for one pixel, the image processing portion 201 in this embodiment determines, based on an image pattern in a boundary area, which one of the pixel values is to be employed.

To describe in more detail, the filtering portion 305 analyzes the image in the projected region of the projector B and determines in which one of two cases, i.e., the case where the smoothing process is more strongly executed in the parallel direction and the case where the smoothing process is more strongly executed in the perpendicular direction, quality of the projected image is less degraded. Then, the filtering portion 305 employs, based on the determination result, the pixel value calculated through the filtering process that has been more strongly executed in the direction in which quality of the projected image is less degraded.

Stated another way, the image processing portion 201 in this embodiment performs the multi-projection by using the projector A (first projector), the projector B (second projector), the projector C (third projector), and the projector D (fourth projector). Further, the image processing portion 201 analyzes the image data input to the image dividing portion 302. When at least respective parts of a first smoothing region corresponding to the boundary between the projected regions of the projectors A and B and a second smoothing region corresponding to the boundary between the projected regions of the projectors B and C overlap with each other, the image processing portion 201 determines the image data, which is to be output, as follows. Depending on the analyzed result of the image data, the image processing portion 201 outputs one of the image data that has been smoothed depending on the direction of the boundary between the projected regions of the projectors A and B and the image data that has been smoothed depending on the direction of the boundary between the projected regions of the projectors B and C. Degradation of the projected image attributable to the filtering process can be reduced by determining the pixel value of the image data, which is to be output, based on the image pattern, as described above.

However, the manner of selecting the pixel value to be employed is not limited to the above-described one. For example, it is also possible to employ a pixel value obtained through the filtering process that is executed depending on the direction of the boundary between the projected region of one of the projector A and the projector C, which has a lower resolution, and the projected region of the projector B.

More specifically, when the resolution of the projector B is higher than that of the projector A and the resolution of the projector A is higher than that of the projector C, the image processing portion 201 executes the filtering process depending on the direction of the boundary between the projected region of the projector C and the projected region of the projector B. Then, the image processing portion 201 outputs the image data in which the pixel value obtained through the filtering process executed depending on the direction of the boundary between the projectors B and C is provided as a pixel value in a region where the smoothing regions overlap with each other.

Stated another way, when at least respective parts of the first smoothing region corresponding to the boundary between the projected regions of the projectors A and B and the second smoothing region corresponding to the boundary between the projected regions of the projectors B and C overlap with each other, the image processing portion 201 determines the image data, which is to be output, as follows. Depending on the resolutions of the projectors A and C, the image processing portion 201 outputs one of the image data that has been smoothed depending on the direction of the boundary between the projected regions of the projectors A and B and the image data that has been smoothed depending on the direction of the boundary between the projected regions of the projectors B and C.

The boundary corresponding to a larger difference in resolution can be made less conspicuous by determining the image data, which is to be output, based on the respective resolutions of the projectors, as described above. Further, by determining the output image data in such a manner, the processing can be simplified in comparison with the case of determining the pixel value based on the image pattern. In addition, the image processing portion 201 may determine the pixel value, which is to be employed, after calculating two pixel values based on two smoothing parameters, or may calculate a pixel value after determining one of the two smoothing parameters.

Other Embodiments

The present invention can also be implemented by executing the following process. More specifically, software (program) for implementing the functions of the above-described embodiments is supplied to a system or an apparatus via a network or some of various storage media, and a computer (or a CPU, an MPU, etc.) in the system or the apparatus reads and executes the program. In an example, a storage media may have stored thereon, a program for a computer that executes a specifying procedure and an output procedure, where the specifying procedure is for specifying a boundary between projected regions of a plurality of projectors having different resolutions based on the resolutions of the plurality of projectors and region information regarding the projected regions of the plurality of projectors, and where the output procedure is for outputting, to the plurality of projectors, image data that is smoothed in accordance with the boundary specified in the smoothing procedure. Here, the program may cause the computer to execute a smoothing procedure for executing smoothing such that pixels arrayed in a direction parallel to the boundary, which has been specified in the specifying procedure, are more strongly smoothed than pixels arrayed in a direction perpendicular to the boundary.

According to the present invention, when one image is displayed by arraying the projected regions of the plurality of projectors, the boundary between the projected regions can be made less conspicuous while reducing degradation of image quality in the projected regions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/069998, filed Nov. 27, 2009, which is hereby incorporated by reference herein in its entirety.

The invention claimed is:

1. An image processing apparatus comprising:
an acquiring unit configured to acquire resolutions of a first and a second projectors and region information regarding projected regions of the first and second projectors;
a specifying unit configured to specify a boundary between the projected regions of the first projector and the second projector having higher resolution than the first projector based on the region information acquired by the acquiring unit;

a smoothing unit configured to execute smoothing on a predetermined region within a projected region of the second projector having higher resolution than the first projector based on the resolutions of the first and second projectors acquired by the acquiring unit such that a pixel obtained based on a first pixel by executing the smoothing has been affected according to a second pixel than a third pixel, wherein the first pixel is included in the predetermined region, the first and second pixels are arrayed in a direction parallel to the boundary specified by the specifying unit, and the first and third pixels are arrayed in a direction perpendicular to the boundary; and an output unit configured to output image data that has been smoothed by the smoothing unit.

2. The image processing apparatus according to claim 1, wherein the output unit outputs the image data, which has been smoothed by the smoothing unit, to at least one of a plurality of projectors.

3. The image processing apparatus according to claim 1, wherein the smoothing unit executes the smoothing such that pixels in a second projected region of a second projector, which are located at a second distance from the boundary between a first projected region of a first projector having a first resolution and the second projected region of the second projector having a second resolution higher than the first resolution are more strongly smoothed than pixels located at a first distance from the boundary, wherein the first distance is longer than the second distance.

4. The image processing apparatus according to claim 1, wherein the acquiring unit acquires resolutions of a plurality of projectors based on notices from the plurality of projectors.

5. The image processing apparatus according to claim 1, further comprising a designation information input unit configured to input designation information to designate projected regions of a plurality of projectors, wherein the acquiring unit acquires the region information regarding the projected regions of the plurality of projectors based on the designation information input through the designation information input unit.

6. The image processing apparatus according to claim 1, further comprising an image input unit configured to input an image picked up by an image pickup unit, wherein the acquiring unit acquires the region information regarding the projected regions of a plurality of projectors based on the picked-up image input through the image input unit.

7. The image processing apparatus according to claim 1, further comprising an analyzing unit configured to analyze image data input to the image processing apparatus, wherein, when at least respective parts of a first smoothing region corresponding to a first boundary between a projected region of a first projector and a projected region of a second projector having a higher resolution than the first projector and a second smoothing region corresponding to a second boundary between the projected region of the second projector and a projected region of a third projector having a lower resolution than the second projector overlap with each other to form an overlapped region, the output unit outputs, depending on a result analyzed by the analyzing unit, one of image data obtained by smoothing the overlapped region in accordance with a direction of the first boundary and image data obtained by smoothing the overlapped region in accordance with a direction of the second boundary.

8. The image processing apparatus according to claim 1, wherein when at least respective parts of a first smoothing region corresponding to a first boundary between a projected region of a first projector and a projected region of a second projector having a higher resolution than the first projector and a second smoothing region corresponding to a second boundary between the projected region of the second projector and a projected region of a third projector having a lower resolution than the second projector overlap with each other to form an overlapped region, the output unit outputs, depending on respective resolutions of the first and third projectors, one of image data obtained by smoothing the overlapped region in accordance with a direction of the first boundary and image data obtained by smoothing the overlapped region in accordance with a direction of the second boundary.

9. An image processing method for an image processing apparatus, the image processing method comprising:

acquiring resolutions of a first and a second projectors and region information regarding projected regions of the first and second projectors;

specifying a boundary between the projected regions of the first projector and the second projector having higher resolution than the first projector based on the acquired region information;

executing smoothing on a predetermined region within a projected region of the second projector having higher resolution than the first projector based on the acquired resolutions of the first and second projectors such that a pixel obtained based on a first pixel by executing the smoothing has been affected according to a second pixel than a third pixel, wherein the first pixel is included in the predetermined region, the first and second pixels are arrayed in a direction parallel to the specified boundary, and the first and third pixels are arrayed in a direction perpendicular to the boundary; and outputting image data that has been smoothed.

10. A non-transitory storage medium storing a program to cause an image processing apparatus to perform a method, the method comprising:

acquiring resolutions of a first and a second projectors and region information regarding projected regions of the first and second projectors;

specifying a boundary between the projected regions of the first projector and the second projector having higher resolution than the first projector based on the acquired region information;

executing smoothing on a predetermined region within a projected region of the second projector having higher resolution than the first projector based on the acquired resolutions of the first and second projectors such that a pixel obtained based on a first pixel by executing the smoothing has been affected according to a second pixel than a third pixel, wherein the first pixel is included in the predetermined region, the first and second pixels are arrayed in a direction parallel to the specified boundary, and the first and third pixels are arrayed in a direction perpendicular to the boundary; and outputting image data that has been smoothed.

11. The image processing apparatus according to claim 1, wherein the smoothing unit executes smoothing for the predetermined region such that a resolution of the pixels in the direction parallel to the boundary is lower than a resolution of the pixels in the direction perpendicular to the boundary.

12. The image processing apparatus according to claim 1, wherein the smoothing unit executes mean value processing for a predetermined number of pixels arrayed in the direction parallel to the boundary and does not execute the mean value processing for the predetermined number of pixels arrayed in the direction perpendicular to the boundary.

13. The method according to claim 9,
wherein smoothing includes executing the smoothing such that pixels in a second projected region of a second projector, which are located at a second distance from the boundary between a first projected region of a first projector having a first resolution and the second projected region of the second projector having a second resolution higher than the first resolution are more strongly smoothed than pixels located at a first distance from the boundary,
wherein the first distance is longer than the second distance.

14. The method according to claim 9, further comprising analyzing image data input to the image processing apparatus,
wherein, when at least respective parts of a first smoothing region corresponding to a first boundary between a projected region of a first projector and a projected region of a second projector having a higher resolution than the first projector and a second smoothing region corresponding to a second boundary between the projected region of the second projector and a projected region of a third projector having a lower resolution than the second projector overlap with each other to form an overlapped region, outputting includes outputting, depending on an analyzed result, one of image data obtained by smoothing the overlapped region in accordance with a direction of the first boundary and image data obtained by smoothing the overlapped region in accordance with a direction of the second boundary.

15. The method according to claim 9, wherein when at least respective parts of a first smoothing region corresponding to a first boundary between a projected region of a first projector and a projected region of a second projector having a higher resolution than the first projector and a second smoothing region corresponding to a second boundary between the projected region of the second projector and a projected region of a third projector having a lower resolution than the second projector overlap with each other to form an overlapped region, outputting includes outputting, depending on respective resolutions of the first and third projectors, one of image data obtained by smoothing the overlapped region in accordance with a direction of the first boundary and image data obtained by smoothing the overlapped region in accordance with a direction of the second boundary.

16. The method according to claim 9, wherein smoothing includes executing smoothing for the predetermined region such that a resolution of the pixels in the direction parallel to the boundary is lower than a resolution of the pixels in the direction perpendicular to the boundary.

17. The method according to claim 9, wherein smoothing includes executing mean value processing for a predetermined number of pixels arrayed in the direction parallel to the boundary and does not execute the mean value processing for the predetermined number of pixels arrayed in the direction perpendicular to the boundary.

18. The non-transitory storage medium according to claim 10,
wherein smoothing includes executing the smoothing such that pixels in a second projected region of a second projector, which are located at a second distance from the boundary between a first projected region of a first projector having a first resolution and the second projected region of the second projector having a second resolution higher than the first resolution are more strongly smoothed than pixels located at a first distance from the boundary,
wherein the first distance is longer than the second distance.

19. The non-transitory storage medium according to claim 10, further comprising analyzing image data input to the image processing apparatus,
wherein, when at least respective parts of a first smoothing region corresponding to a first boundary between a projected region of a first projector and a projected region of a second projector having a higher resolution than the first projector and a second smoothing region corresponding to a second boundary between the projected region of the second projector and a projected region of a third projector having a lower resolution than the second projector overlap with each other to form an overlapped region, outputting includes outputting, depending on an analyzed result, one of image data obtained by smoothing the overlapped region in accordance with a direction of the first boundary and image data obtained by smoothing the overlapped region in accordance with a direction of the second boundary.

20. The non-transitory storage medium according to claim 10, wherein when at least respective parts of a first smoothing region corresponding to a first boundary between a projected region of a first projector and a projected region of a second projector having a higher resolution than the first projector and a second smoothing region corresponding to a second boundary between the projected region of the second projector and a projected region of a third projector having a lower resolution than the second projector overlap with each other to form an overlapped region, outputting includes outputting, depending on respective resolutions of the first and third projectors, one of image data obtained by smoothing the overlapped region in accordance with a direction of the first boundary and image data obtained by smoothing the overlapped region in accordance with a direction of the second boundary.

21. The non-transitory storage medium according to claim 10, wherein smoothing includes executing smoothing for the predetermined region such that a resolution of the pixels in the direction parallel to the boundary is lower than a resolution of the pixels in the direction perpendicular to the boundary.

22. The non-transitory storage medium according to claim 10, wherein smoothing includes executing mean value processing for a predetermined number of pixels arrayed in the direction parallel to the boundary and does not execute the mean value processing for the predetermined number of pixels arrayed in the direction perpendicular to the boundary.

* * * * *